United States Patent [19]

Lebourges

[11] Patent Number: 5,463,686
[45] Date of Patent: Oct. 31, 1995

[54] COMMUNICATION ROUTING METHOD WITH INCOME OPTIMIZATION FOR TELECOMMUNICATION NETWORKS

[75] Inventor: Marc Lebourges, Orgerus, France

[73] Assignee: France Telecom, Paris, France

[21] Appl. No.: 45,390

[22] Filed: Apr. 13, 1993

[30] Foreign Application Priority Data

Apr. 17, 1992 [FR] France ................. 92 04814

[51] Int. Cl.$^6$ ............... H04M 3/36; H04M 7/06
[52] U.S. Cl. ............ 379/220; 379/219; 379/221; 379/115
[58] Field of Search ............ 379/219, 220, 379/221, 229, 230, 112, 113, 115

[56] References Cited

U.S. PATENT DOCUMENTS

| | | | |
|---|---|---|---|
| 4,284,852 | 8/1981 | Szybicki | 279/221 |
| 4,577,066 | 3/1986 | Bimonte et al. | 379/221 |
| 4,669,113 | 5/1987 | Ash et al. | 379/113 |
| 4,756,019 | 7/1988 | Szybicki | 379/112 |
| 4,788,721 | 11/1988 | Krishnan et al. | 379/221 |
| 4,831,649 | 5/1989 | Mejane | 379/115 |
| 4,873,517 | 10/1989 | Baratz et al. | 379/220 |
| 4,931,941 | 6/1990 | Krishnan | 379/220 |
| 4,979,118 | 12/1990 | Kheradpir | 379/221 |
| 4,991,204 | 2/1991 | Yamamoto et al. | 379/221 |
| 5,142,570 | 8/1992 | Chaudhary et al. | 379/221 |
| 5,163,042 | 11/1992 | Ochiai | 379/112 |
| 5,359,649 | 10/1994 | Rosu | 379/220 |

OTHER PUBLICATIONS

"Implementing Dynamic Routing in the Local Telephone Companies of USA", by V. P. Chaudhary et al, 13th ITC Conference, pp. 87–91, 1991.

"Routing of Telephone Traffic or a Controlled Marker Process", Krishnan et al. Proceedings of 23rd Conference on Decision and Control, IEEE, 1984 pp. 1388–1390.

"Multihour Dimensioning for a Dynamically Routed Network", Huberman et al., Eleventh ITC, Sep. 1985, pp. 4.3A–5–1 to 4.3A–5–7.

"Performance Issues in the Design of Dynamically Controlled Circuit–Switched Networks", Chemouil et al., IEEE Commications Magazine, Oct. 1990, pp. 90–95.

"State Dependent Routing of Telephone Traffic and the Use of Separable Routing Schemes" T. J. Ott et al., Eleventh ITC, Sep. 1985.

"A Survey of Dynamic Routing Methods for Circuit Switched Traffic" B. R. Hurley et al., IEEE Communications Magazine, Sep. 1987, vol. 25, No. 9.

"Recursive Formulas for the Calculation of Point to Point Congestion" Gaudreau, IEEE Transactions on Communications, vol. COM–28, No. 3, Mar. 1980.

"Dynamic Routing for Intercity Telephone Networks" Cameron et al., Tenth ITC, Montreal, Jun. 1983.

Primary Examiner—Jeffery A. Hofsass
Assistant Examiner—Scott L. Weaver
Attorney, Agent, or Firm—Lowe, Price, LeBlanc & Becker

[57] ABSTRACT

A list of routing objects is associated with each switching node of a telecommunication network. This list includes a plurality of routing objects whose parameters are described in tree-structure form. Responsive to a call message received by said node, routing objects of the list whose parameters have tree-structure descriptions included in tree-structure descriptions of signalling elements of the call message are searched. Among all these routing objects, an object having a maximum gain is selected so as to route a communication associated to said call message according to a downstream path parameter of the object selected. Gains for each object are computed as a function of charge recorder information. New objects are created by incrementing by one level the tree-structure of each parameter of said maximum gain object. Each object whose difference in gain per communication with the maximum gain object is high is maintained. The other objects, which are less advantageous from an economic point of view, are deleted.

3 Claims, 6 Drawing Sheets

FIG. 1A (PRIOR ART)
(ROUTING WITH OVERFLOW)

FIG. 1B (PRIOR ART)
(ROUTING WITH LOAD-SHARING)

FIG. 1C (PRIOR ART)
(ADAPTIVE ROUTING)

| |
|---|
| $OA_i^S$ (routing object) |
| $CM_i$ (upstream path) |
| $O_i$ (origin) |
| $D_i$ (destination) |
| $S_i$ (service parameter) |
| $CV_i$ (downstream path) |

COMMUNICATION ROUTING METHOD WITH INCOME OPTIMIZATION FOR TELECOMMUNICATION NETWORKS

BACKGROUND OF THE INVENTION

1. Field of the Invention

The present invention relates generally to the routing of communications in telecommunication networks.

2. Description of the Prior Art

Telecommunication networks consist of a set of switching nodes interconnected by circuits referred to as trunk group links and define more or less complex linked structures, for instance at national scale with several hierarchical levels for the Switched Telephone Network. The prior art provides five basic routing methods : fixed, overflow, load sharing, multi-period and adaptive routing.

Figure 1A:
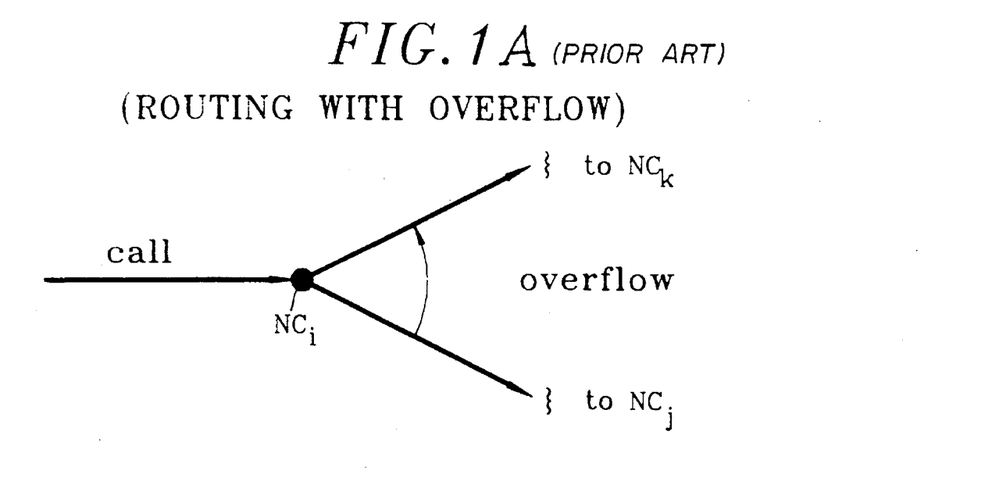
FIGS. 1A, 1B and 1C, already described, schematically illustrate routing methods according to the prior art.
Figure 1B:
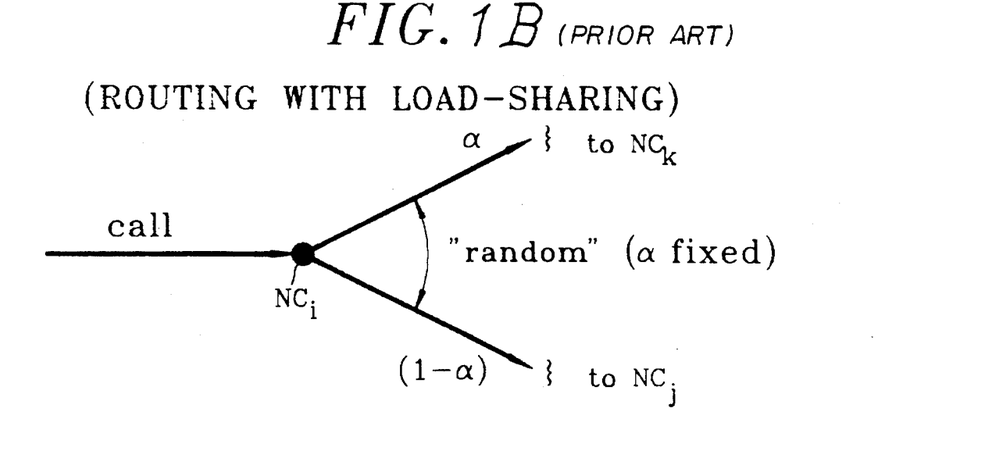
Figure 1C:
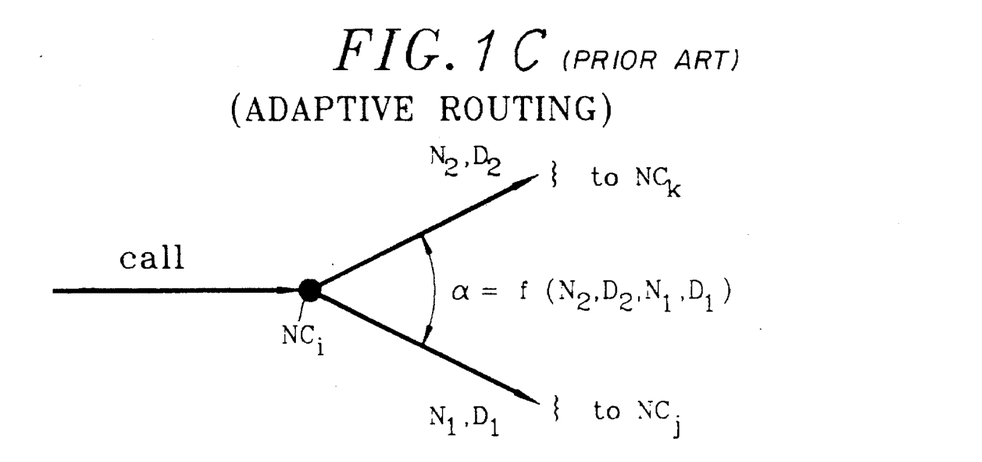

FIGS. 1A, 1B and 1C schematize three of these five methods for a switching node $NC_i$ of the network connected to other nodes ... $NC_h$, ... $NC_j$ ... by respective paths.

Concerning overflow routing, the principle of which is shown schematically in FIG. 1A, node $NC_i$ routes all the communications relating to a given origin and a given termination each time along the same priority path, for example in the direction of node $NC_j$, except in the case this priority path is saturated for which the communications "overflow" onto a parallel path, for example in the direction of node $NC_k$. All the paths are pre-established when planning the network.

Within the context of load sharing, the principle of which is schematized in FIG. 1B, node $NC_i$ does not, a priori, give preference to any path as defined in "overflow" routing. This second process therefore consists in routing a proportion $\alpha$ of the calls in one of the two paths, for example to node $NC_k$, a proportion $(1-\alpha)$ of the calls being directed in the other of said paths, for example towards node $NC_j$. This method requires random drawings.

The last of the methods, known as adaptive routing, shown in FIG. 1C, here schematized within the context of load sharing, consists in dynamically modifying routing parameters by using a very general principle of back-reaction regulation according to the very general automation model. In the case shown here, $\alpha$ varies as a function of $N_1$, $N_2$ and $D_1$, $D_2$ which designate the number of calls directed to a first path, connected to node $NC_j$, respectively a second path connected to node $NC_k$, and the number of calls having actually converged across this first path, and respectively the second path. Although described here within the context of load sharing, adaptive routing is used in many other applications such as approach via residual capacity.

Whatever the aforesaid methods, none of them employs income optimization criteria in the routing models which are proposed. Nevertheless, more recent control mechanisms taking into account economic factors in the working of networks appear on the scene in these latter years. Thus, to take an example, it can be referred to Bellcore's DCR-5 system which is described in the article "Implementing Dynamic Routing in the Local Telephone Companies of USA", V. P. Chaudary, K. R. Krishnan and C. D. Pack; 13th ITC conf. p. 87–91, Copenhagen, 1991. This routing system employs an adaptive method according to which indicators used for the adaptive routing of calls are managed by integrating the notion of cost (loss for the network operator). These are average costs per Erlang, modelized and computed independently of the operating of the network in real-time. Periodically, for given network configurations, several lost incomes of which the network operator is responsible are computed if respective calls are routed by each of admissible paths. These costs, or lost incomes, are computed taking account of blocking of calls subsequent to the routing of said calls. In other words, the effect of a call on the blocking of subsequent calls is simulated, these "lost" calls correspond to income losses for the network operator. Income optimization in such a system then consists in maximizing the number of calls, or more exactly, minimizing the number of blocked calls, by routing the calls on paths entailing minimum call blocking. In fact, the losses induced by the blocking of calls are expressed in terms of lost income by fixing an identical income per Erlang for each switching node in the network.

Two main drawbacks appear in the prior art as defined above:

All the routing method initially described are generally completed, in view of optimum implementation, by specific control mechanisms dealing with the minimalization of lost calls, network protection or, for example, as described above, income optimization. Specific developments are then necessary for each method and control to be carried out in the network, which do not lead to an integration unity of the different modules installed concerning the various mechanisms; consequently, functional unity and coherence cannot be achieved; and the network optimization mechanism described above within the context of the Bellcore DCR-5 system implies, due to the very fact that an income given per Erlang is allotted to each switching node, that this mechanism cannot be installed globally in the whole of the network such as the Switched Telephone Network.

These "modelized" incomes per Erlang for each of the switching nodes in the network have an economic significance and one and only one algorithm cannot manage the whole of a network with several hierarchical levels. In fact, in the case for example of the Switched Telephone Network, it is not possible to consider employing .such a method globally over the whole of said network. This would have no meaning economically: according to this method, a switching node is selected from amongst several nodes of homogeneous hierarchical level by computing the respective costs of call blocking on the trunk group links, subsequent to the routing of calls on said trunk group links. If this simulation were used for several hierarchical levels of the network, it would obviously produce incoherent results in the routing of a given call.

Apart from these two major drawbacks, certain functions remain unexploited according to the prior art:

the economic optimization of the routing of a communication from an origin to a destination;

the use of available capacities in real time in case of failures independently of the routing schemes pre-established when planning the network;

differences in routing modes between networks with different switching modes (circuit, packet, ... ), inhibiting until now any global multi-network optimization for communications using these different networks (access to a packet network via the switched network); and the modelization of the incomes in the current methods does not allow for the adaptation of different costing modes (on setting up, on the duration, on the flow), to fluctuation in traffic conditions and to users' behavior (repetition of calls, etc.).

OBJECTS OF THE INVENTION

The main object of this invention is to remedy the preceding disadvantages according to the prior art.

Another object of this invention is to provide a routing method offering a dynamic management of routing objects dependent on the real-time operation of the network.

SUMMARY OF THE INVENTION

Accordingly, in a switching node of a telecommunication network, a method for routing a communication to be set up during a call procedure of the communication is such that a list of routing objects is associated to the switching node, each of the routing objects including five parameters which are an upstream path parameter, an origin parameter, a destination parameter, a service parameter and a downstream path parameter, each of the five parameters being described in a tree-structural form which can be trivial for some of the parameters, and during the call procedure, a call message is transmitted, this call message including two first signalling elements defining respectively origin and destination of the communication to be set up and in the case where a tree-structure of the upstream path parameter is not trivial, a second signalling element defining an upstream path followed by the call message in the network from the origin up to the switching node.

The routing method further comprises the following steps:

searching for routing objects of the list including origin, destination and upstream path parameters compatible with the signalling elements of the call message in that their tree-structural descriptions have depths less than those of the signalling elements, respectively, selecting among the routing objects whose origin, destination and upstream path parameters are compatible with the signalling elements, a given routing object having a maximum gain equal to a difference which is maximum, this difference being between incomes and costs accounted in real-time depending on charging information relative to various communications associated logically with the given routing object which is maximum, and associating logically the communication to be set up with the given routing object, so as to route the communication to be set up along a downstream path defined by the downstream path parameter of the routing object having the maximum gain and updating the maximum gain of the given routing object as a function of charge information of the communication to be set up after setting up of the latter, a third signalling element defining the downstream path being included in a call message to be transmitted to a switching node following the switching node along the downstream path if the downstream path defined by the downstream path parameter of the routing object having the maximum gain is described in non-trivial tree-structural form.

According to a feature of the invention, the routing objects of the list are obtained as from the following steps:

on receipt of each of call messages or all the N call messages, N being a predetermined integer at least equal to 1, creating new routing objects in a number equal to or less than the number of parameters in a routing object, each of the new routing objects being identical to a routing object having a maximum gain with the exception of a respective parameter whose tree-structural description depth is incremented by one level, computating respective gains of the new routing objects by associating them logically with communications being set up and resulting from respective call messages whose signalling elements are compatible with origin, destination and upstream path parameters of the new routing objects, and deleting in the list each of routing objects having a segmentation gain equal to a difference, per communication, between a gain of each of said routing objects and a gain of a routing object having given rise to its creation multiplied by a number of communications associated logically to each of said routing objects, is too low as a function of a limitation in number of the size of the list.

Advantageously, the selection step beforehand comprises the following sub-steps:

classifying routing objects into families having respective homogeneous tree-structure depths for the five parameters, and correcting gains per communication for respective routing objects of the families by deducting segmentation gains relative to a reference family into maximum corrected gains, so as the selection step consists in selecting a routing object with a corrected gain which is maximum.

According to another feature of the invention, the costs accounted in real-time depending on charging information modify gains of routing objects in the two following cases:

a) responsive to an overflow from the downstream path which is defined by the downstream path parameter of the routing object having a maximum gain to another downstream path defined by another downstream path parameter of another routing object whose origin, destination and upstream path parameter are compatible with the signalling elements and having a gain immediately lower than the maximum gain, a cost resulting from the overflow being equal to a difference between a first expected gain equal to a first gain per communication of the routing object having a maximum gain if the communication to be set up had been routed along the downstream path defined by said downstream path parameter, and a second expected gain equal to a second gain per communication along another downstream path defined by the another downstream path parameter; and b) responsive to a definitive refusal of the communication to be set up by the switching node, a cost resulting from the refusal being equal to an expected gain per communication of a last routing object whose node of a downstream path defined by a downstream path-parameter gives rise to the refusal.

BRIEF DESCRIPTION OF THE DRAWINGS

Other features and advantages of the invention will be apparent more clearly from reading the following description of several preferred embodiments of this invention with reference to the corresponding accompanying drawings in which.

DESCRIPTION OF THE PREFERRED EMBODIMENTS

To take a non-exhaustive example, the method embodying the invention is described below within the context of a Telephone Network. As the following description is read, it will be progressively appreciated that implementation of the method embodying the invention can concern other types of telecommunication networks employing the "connection" mode, i.e., for which a call procedure precedes the setting up of a communication through the network. Thus, for example, the method embodying the invention can be extended to a packet switching network in which case economic optimization of the connection between user terminals through the packet switching network via the Telephone Network can be implemented within the context of the method embodying the invention.

After having briefly defined features of the Switched Telephone Network by referring to FIGS. 2 and 3, and the specific implementation of routing objects in the switching nodes of the Network, the method embodying the invention will be described with respect to three elementary procedures composing it, these being:

a procedure for managing a routing object list in each node;

a procedure for routing communications in each switching node; and a procedure for updating gain-per-routing object values.

Figure 2:
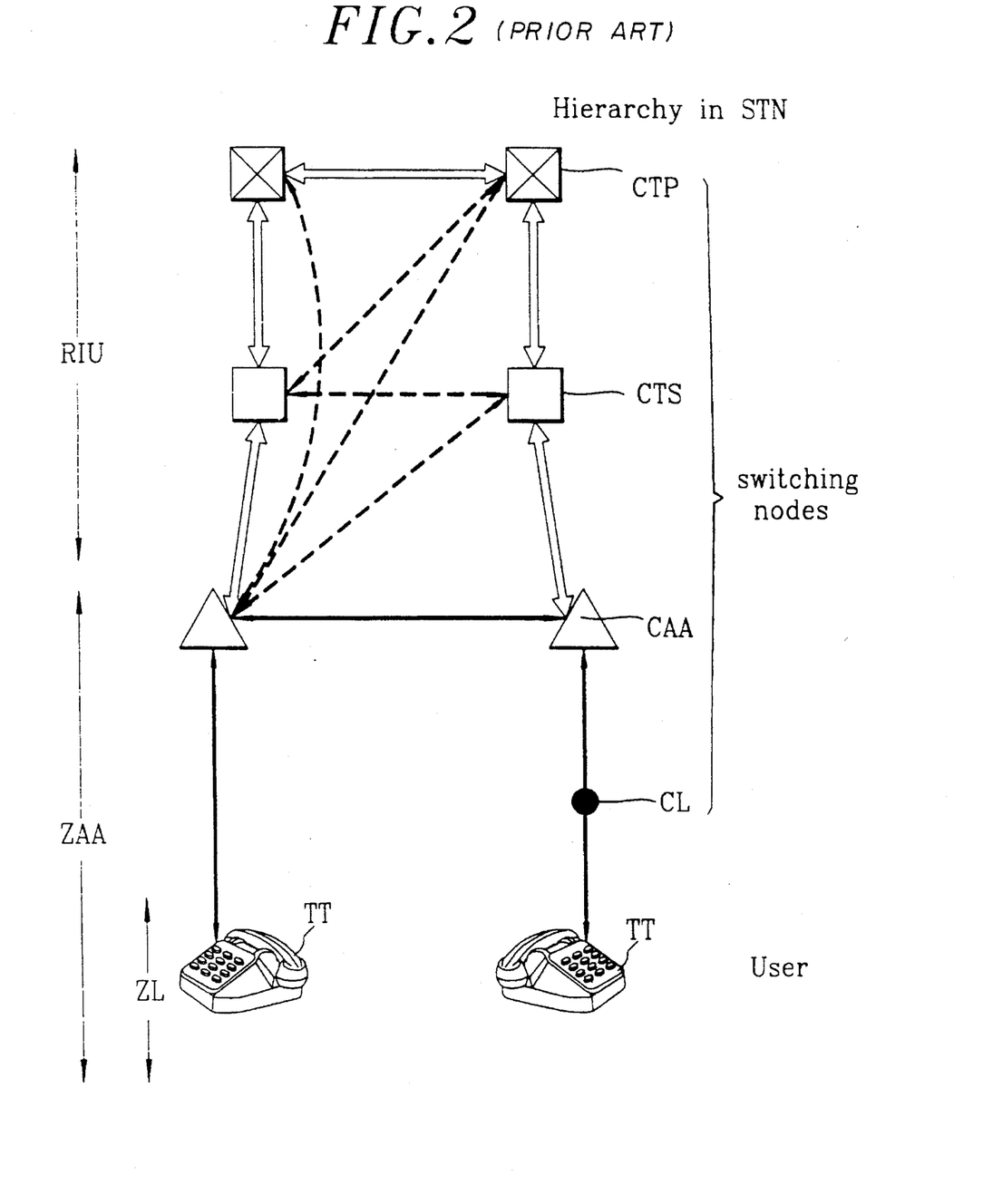
FIG. 2 is a hierarchical block-diagram of the Switched Telephone Network.

Refering to FIG. 2, the Switched Telephone Network (STN) is comprised of a plurality of switching nodes distributed, for example, in four different hierarchical levels, especially as a function of their respective functions within the Switched Telephone Network. In the increasing direction of the hierarchy, it can be singled out the local exchanges CL, the routing autonomy exchanges CAA, the secondary transit exchanges CTS and the main transit exchanges CTP. User telephone terminals TT are linked, according to FIG. 2, either to a routing autonomy exchange CAA or to a local exchange CL. A communication is set up between two terminals within the STN network via a given path through switching nodes, for example according to a routing strategy such as those defined in the preamble of the description. Two layers of hierarchical levels can be singled out topologically in the network, these being the routing autonomy zone ZAA which includes the local exchanges CL and the routing autonomy exchanges CAA, and the trunk network RIU which comprises the main and secondary transit switching exchanges CTP and CTS.

Figure 3:
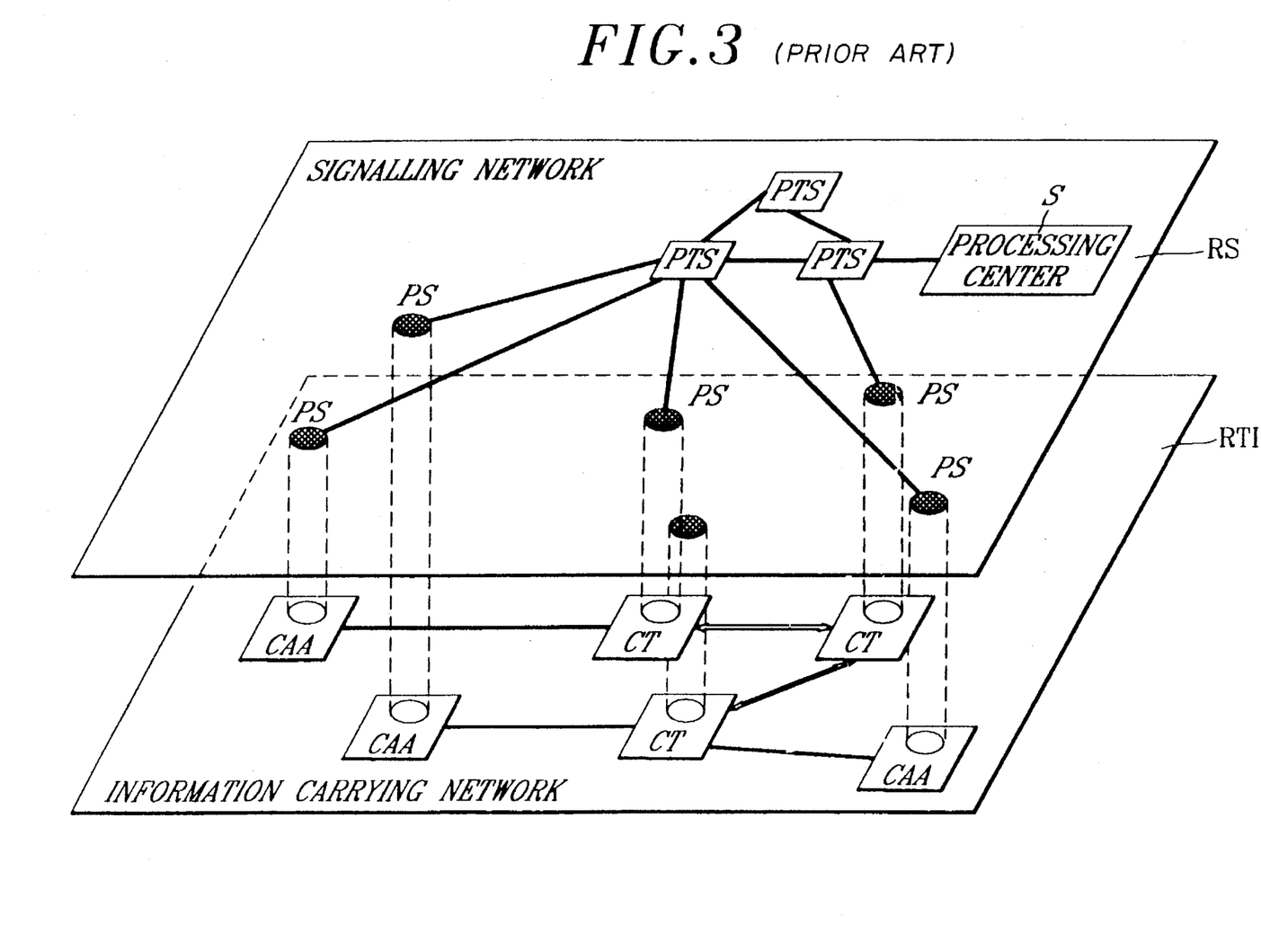
FIG. 3 is a block-diagram illustrating the information carrying network—signalling network duality in the Switched Telephone Network.

Within the context of signalling processing (setting up of calls, charging, etc.) in the Telephone Network, it is conceptually advantageous to make a distinction between two "sub-networks" in the Telephone Network, as shown in FIG. 3.

In this figure the two "sub-networks" forming the Switched Telephone Network are the information carrying network RTI and the signalling network RS. The information carrying network carries actual information exchanged between subscriber terminals (speech or data). For its part, the signalling network carries and manages messages to operate the network, the signalling of call setting up, the charging results, and if required, traffic observations, contents of data banks (tables, programs), etc. The switching nodes which are shown in the figure by Routing Autonomy Exchanges CAA and Transit Exchanges CT, are associated to the Information Carrying Network in their switching and carrying function. Signalling points PS and signalling transfer points PTS are linked to the Signalling Network. They respectively form nodes connecting to the Information Carrying Network, especially accesses to the switches in the CAA and CT exchanges to present their signalling messages, and signalling transfer function modules. A processing center S has been deliberately shown on FIG. 3 to illustrate the possibility of access to a data bank content stored in memory in this processing center S, by signalling transfer points PTS. In practice, signalling links in which messages transmitted in the Signalling Network can be carried out in multiplex time intervals at a bit rate of 64 kbit/s.

The general structure of the Switched Telephone Network has been detailed above so as to refer to it when implementing the method as embodied by the invention, notably when "transmitting" charging information in the Signalling Network RS.

It should be observed that the different functionalities of each hierarchical level in the STN network, such as the links set up by the trunk network to link together several hundred routing autonomy exchanges CAA either directly, or via transit exchanges, by means of several thousand trunk groups performing functions such as transit and safety by overflow, are of little importance within the context of the method embodying the invention. In fact, in order to grasp the implementation of the method embodying the invention within the context of the Telephone Network, it is necessary to imagine this latter in a form entirely stripped of its actual routing functions concerning the rules and mechanisms for selecting a given path. The network would then appear as a grid structure of switching nodes interconnected together by means of trunk groups. For this purpose only the term "switching node" noted NC, will be used from now on.

Figures 4, 5:
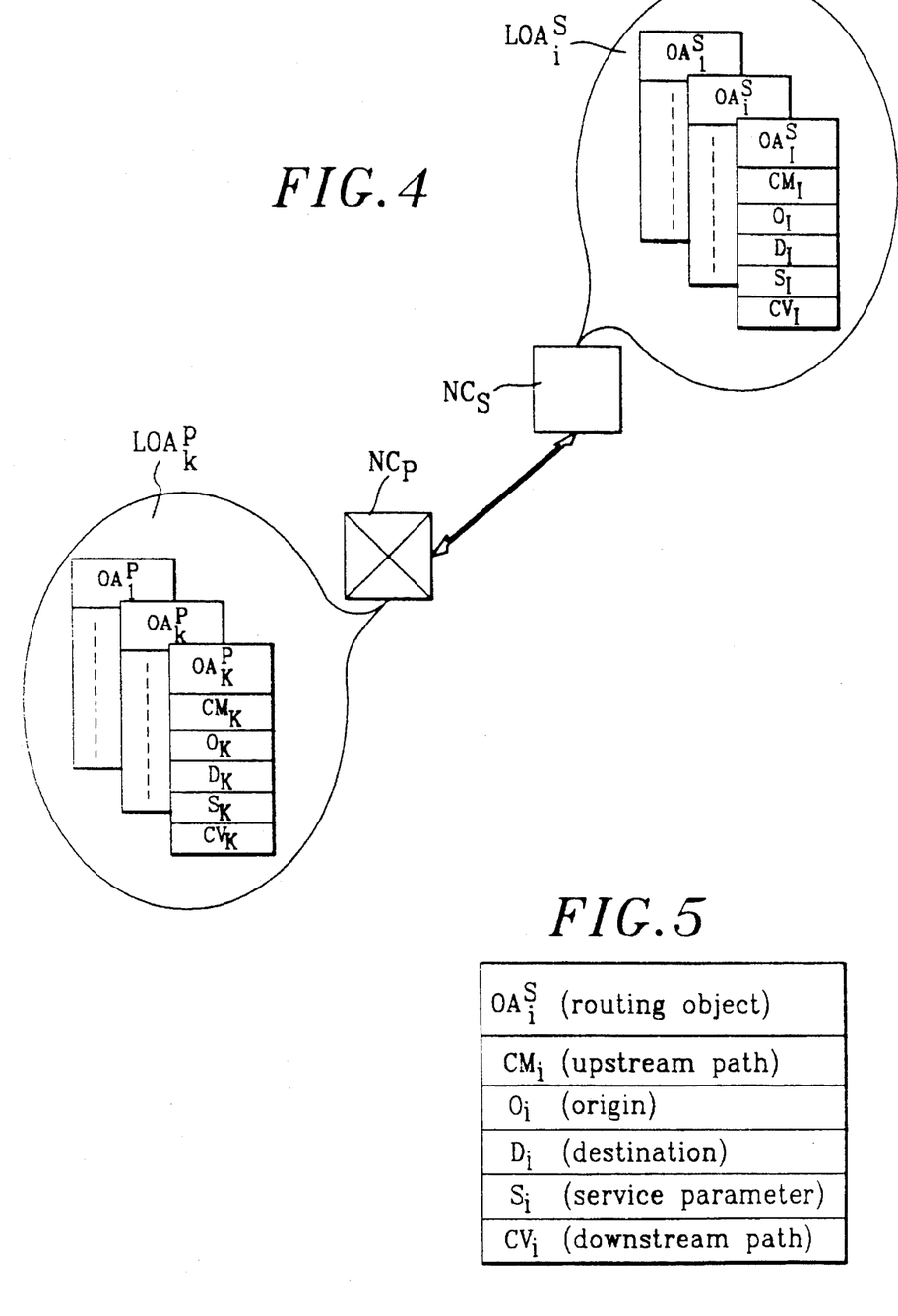
FIG. 4 is a schematic diagram showing the association of lists of routing objects to switching nodes for carrying out the method embodying the invention.
FIG. 5 shows in detail a routing object defined in FIG. 4.

Referring to FIG. 4, respective routing object lists $LOA^P_k$ and $LOA^S_i$ are shown symbolically in the form of two sets of routing "cards" associated to two respective switching nodes $NC_P$ and $NC_S$. Within the context of the method embodying the invention, each switching node in the network is associated to a respective routing object list. In practice, the architecture best suited to the method embodying the invention is an architecture distributed on the switching nodes of the network and hence the association of a routing object list to a node results in the list being stored in memory in the switching node. Nevertheless, a centralized architecture may be used in the context of the method, in which case several routing object lists respectively associated to several switching nodes are stored in a same routing management center linked to the nodes. As will be seen later, these routing object lists are managed dynamically. Each routing object list associated to a respective switching node $NC_P$ with index P, or $NC_S$ with index S, consists of a plurality of routing objects (cards) such as $OA^P_k$, k lying between 1 and K or $OA^S_i$, i lying between 1 and I, as shown in FIG. 4.

FIG. 5 shows more exactly, and in a modelized way, a routing object $OA^S_i$ in a list associated to a switching node $NC_S$. Each routing object here $OA^S_i$, consists of five parameters which are an upstream path parameter $CM_i$, an origin parameter $O_i$, a destination parameter $D_i$, a service parameter $S_i$, and a downstream path parameter $CV_i$. All these parameters are described tree-structurally. In a switching node of the network the associated corresponding list is used to route calls transiting through said node, as described later in the description. The tree-structure of the parameters can be introduced as follows:

- the origin $0_i$ and destination $D_i$ parameters are written in the form of a partial telephone number (prefix) or a complete one (47-32-..-..- or 47-32-17-18); such a state display integrates this level of tree-structural description considering the significance of each figure of a number for the routing of a call.

- the upstream $CM_i$ and downstream $CV_i$ path parameters of a routing object of a list associated to a given switching node designate respectively a sequence of switching nodes crossed through prior to the given node, including the given node, and a sequence of switching nodes crossed after the given node. It is clear that another tree-structure designation can be chosen for the upstream $CM_i$ and downstream $CV_i$ path parameters, such as for example a designation in terms of links between switching nodes;

- whereas the previous parameters $O_i$, $D_i$, $CM_i$ and $CV_i$ are described by a "topological"-type tree-structure, the service parameter $S_i$ is described by a tree-structure relative to the scale of the technical conditions required for a given communication. Thus, for example, in order of importance, technical constraints, a mean flow and a peak flow can be defined.

The content and structure of the information has been indicated above in the form of routing object lists necessary to implement the method embodying the invention. Each routing object list associated to a respective switching node of the Switched Telephone Network according to the preferred embodiment, is not static but is managed dynamically in the node according to an income optimization objective on routing each communication transiting via the associated switching node. As will be seen later, this income optimization objective is based on the association to each routing object of the list, of a gain intensity variable which is a difference between costs and incomes computed relatively to existing information in the network, information offering in real-time a cost value for a service offered, such as information available in the charge recorders in the switching nodes.

Figure 6A:
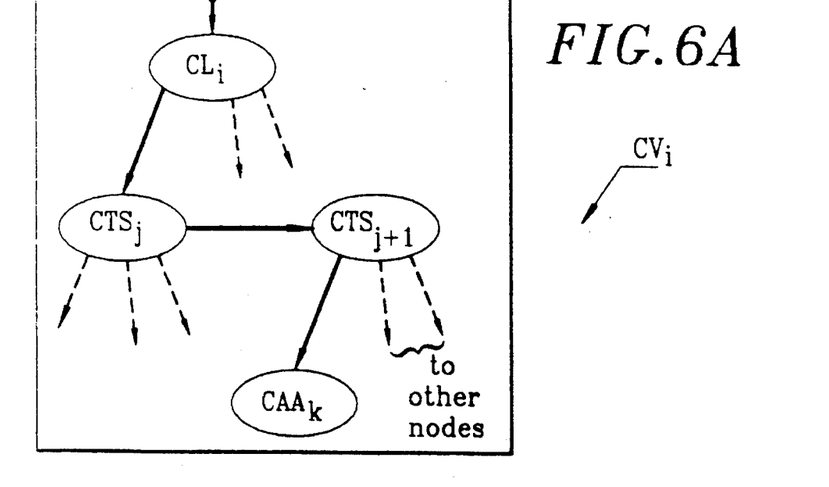
FIGS. 6A, 6B and 6C show examples of tree-structure description of three routing object parameters, respectively.
Figure 6B:
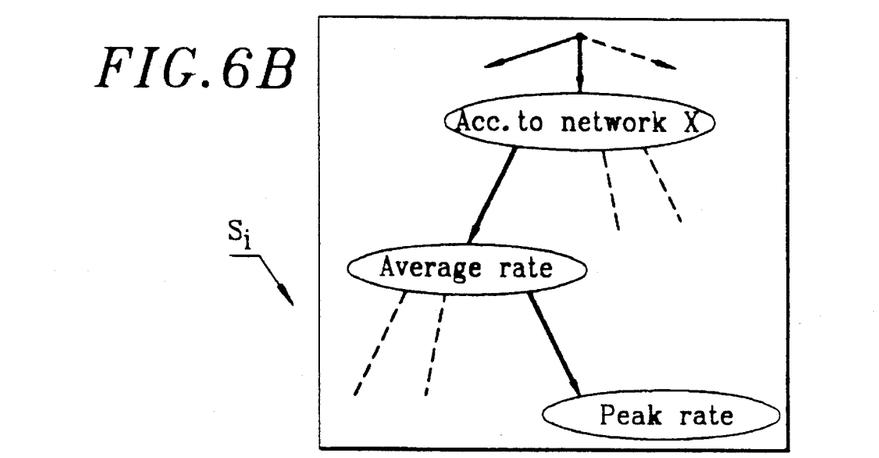
Figure 6C:
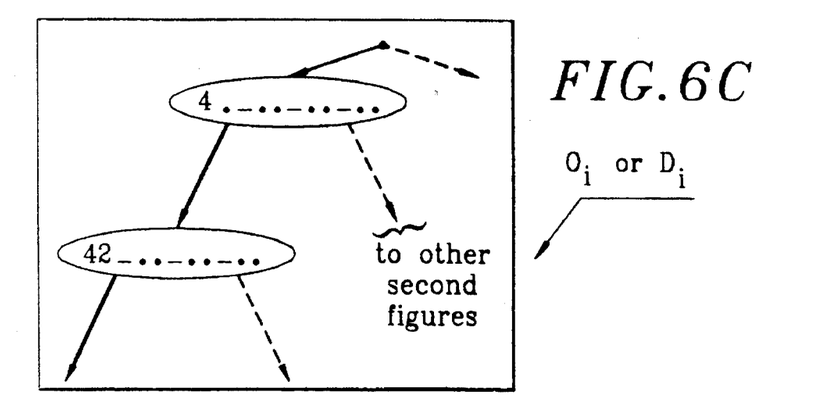
Figure 7:
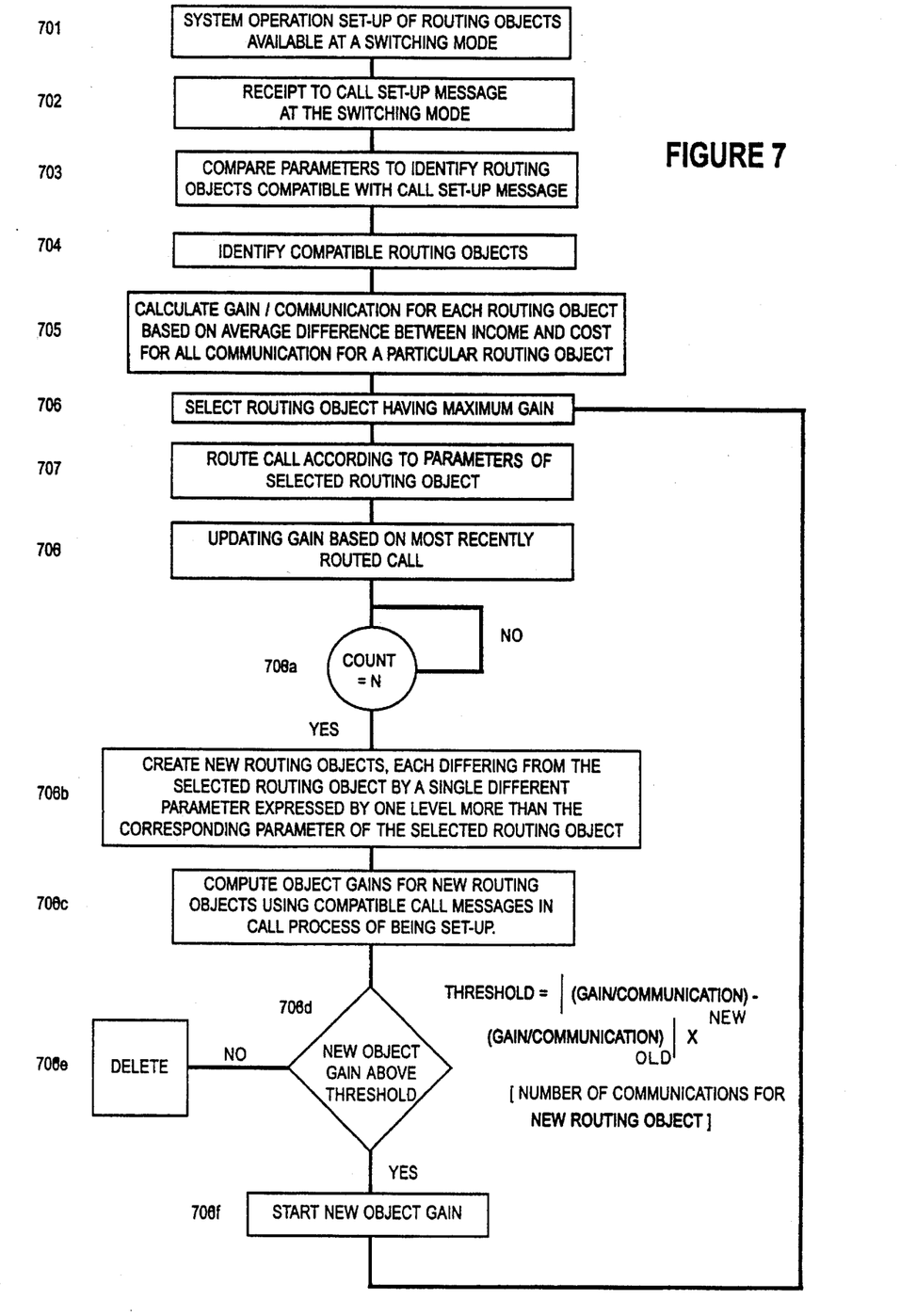
FIG. 7 is a flow chart depicting the method of the invention.

FIGS. 6A, 6B and 6C illustrate three schematic views of the tree-structural description respectively of three "downstream" $CV_i$, "service" $S_i$ and "origin" $O_i$ or "destination" $D_i$ parameters included in one $OA_i$ of the routing objects of a list associated to a switching node. Thus, concerning the downstream path parameter $CV_i$, the latter is described in a switching node's tree-structure forming a path in the Telephone Network; for example, a $CV_i$ parameter includes a sequence of node addresses as from the current node, such as $CL_i$, $CTS_{j+1}$ and $CAA_k$ by re-employing the terminology of the switching stations making up the telephone network. Similarly, each service parameter $S_i$ is represented by a tree-structure, in order of importance, of services required by a communication. On FIG. 6B, to take an example, a service parameter $S_i$ can include a sequence of sub-parameters defining an access to a specific network carrying a given average flow and a peak flow. FIG. 6C relates to origin $0_i$ or destination $D_i$ parameters.

The tree-structure of certain parameters can be limited deliberately for purposes of simplification of carrying out of the method embodying the invention. Thus, by limiting for example the tree-structural description of the downstream $CV_i$ and upstream $CM_i$ path parameters in trivial form solely to the corresponding incoming and outgoing trunk groups, respectively, only a local information is necessary to the switching node concerned without it being necessary to carry signalling elements via the signalling network RS throughout the time during which the communication is set up.

After having defined the nature of the routing object lists associated to respective nodes, the method embodying the invention is now described, notably with respect to the three elementary procedures which make it up:

- the procedure for managing a routing object list associated to a given node;
- the procedure for processing communication calls in a given node, and
- the procedure for updating a gain intensity variable for a routing object of a list associated to the given node.

Procedure for managing a routing object list associated to a given node

In each switching node of the network, an associated routing object list is managed dynamically so that it only contains objects said to be "with maximum segmentation gain". As will be seen later when describing the two following procedures, a gain which is equal to an algebraic sum of incomes and costs per unit of time is associated to each routing object, said incomes and costs being relative respectively to charge account information for various communications set up which are associated logically with said routing object and to seizing refusals, or overflow of calls refused on resources, such as trunk groups and switching nodes, used by said set up communications.

Returning back to FIG. 4, when a call message routed by the signalling network (FIG. 3) reaches a given switching node $NC_P$, the routing of the communication associated to the call message depends on the choices offered by the routing objects $OA^P_k$ of the list $LOA^P_k$ associated to the switching node $NC_P$. More precisely, the call procedure to set up a communication consists in the transmission through the Signalling Network RS of a call message comprising, in the same encoded form as the parameters of a routing object, elements identifying the call incoming into the node.

The call message comprises two first signalling elements which define the origin and destination of the communication associated to the call message, in terms of telephone numbers in the preferred embodiment.

According to a first alternative, the call message includes a second signalling element which defines the upstream path, the call has already gone along as far as the given node.

According to a second alternative of the invention, relating to what has been stressed referring to FIGS. 6A, 6B and 6C, the tree-structural description of the "upstream path" CM and "downstream path" CV parameters can be reduced simply to the incoming and outgoing trunk groups alone; for this alternative, the second signalling element is not necessary given that each switching node is capable of locally establishing the address of the incoming trunk group or the upstream switching node without having recourse to a signalling message.

The set of routing objects compatible with the call message is searched for in the given switching node of the Telephone Network, namely the routing objects comprising origin, destination and upstream path parameters whose tree-structural descriptions respectively constitute beginnings of tree-structural description of the signalling elements of the call message. Thus, to take an example, the destination parameter consisting of the prefix "27-80-..-.." is compatible with the destination signalling element "27-80-17-18" of a telephone number of a call message. Amongst these compatible objects, an object is selected to route the communication associated to the call and this object is the one with maximum gain per communication, the gain being computed from charging information, as will be detailed later. The communication is then associated logically to the routing object selected to be routed according to the downstream path of the downstream path parameter of said object.

According to the object list management procedure embodying the invention, each of the routing object lists is managed dynamically on the basis of economic criteria. This procedure involves convergence towards optimum routing object lists at a given moment, by creating or suppressing routing objects composing them.

The object list management procedure is now described in detail.

As has been previously seen, a gain equal to a difference between incomes and costs relative to the various telephone communications for which a routing object has been selected during respective call procedures is associated to said routing object. Well aware that each of the parameters of a routing object is described tree-structurally as shown in FIGS. 6A, 6B and 6C, it is possible to "segment" these parameters, i.e., "cut" the tree-structure of a parameter in two, or conversely, "merge" for a given type of parameter, two tree-structures of two parameters of the same type belonging to two respective routing objects. With this important notion, it is possible to grasp the definition of "segmentation gain". "Segmentation gain" of a routing object for a given parameter is the product of the absolute value of the difference between the gain per communication associated to said routing object and the gain per communication associated to a father of the object for said given parameter, by the number of communications in process associated logically to said object. The father of a routing object for a given parameter consists in a second routing object, all the parameters of which, except one parameter, have tree-structural description identical to the parameters of said routing object, said one parameter having a tree-structural description located upstream from one level of depth in relation to the tree-structural description of the parameter of said routing object.

This notion of segmentation gain is important within the scope of the invention. In fact, it contributes to evaluating the economic advantage in a distinction between routing objects whose tree-structural descriptions of the same parameter are different by one level of depth. To take an example, it is assumed that the tree-structural description of a downstream path parameter CV of a given routing object consists in a switching node located downstream from the current node; it may be economically advantageous to determine in the current node, for the routing of communications, given the fixed tree-structural descriptions of the other parameters, not only one downstream switching node but two nodes. In this case it would appear that the segmentation of this object including a tree-structural description of the downstream path parameter in the form of two nodes, relative to the object of the single node tree-structural description, has a relatively high value. This notion of segmentation gain is an essential one and should not be confused with the notion of gain.

The procedure for managing a routing object list must simultaneously satisfy two conditions:

firstly, the number of routing objects for each of the switching nodes should not be too high in order that they may be managed in real-time; and secondly, each existing routing object should offer an economic solution advantageous for the network operator.

To do so a routing object list management processor associated to the node decides, on receiving a call message, on the opportuneness of incrementing, by one level of depth, the tree-structural description of five parameters composing the routing object compatible with the call message and having a maximum gain. For each call message, objects are thus created by respective incrementations by one level of the tree-structures of parameters in the compatible object having the maximum gain. According to a feature of the invention, nevertheless the creation of new objects for each call relative to the parameters of a routing object compatible with this call is not being considered and this creation would be limited to a call every N calls, N being a predetermined integer. With this possibility a compromise can be obtained between the speed of adaptation of the segmentation of the objects as a function of the traffic configuration and the processing load required for this object list management procedure. Thus, five new routing objects, in each of which four parameters remain unchanged, are thus created given that the routing object compatible with the call includes five parameters (upstream path, origin, destination, service and downstream path). Then for each of the five new routing objects the respective segmentation gain is computed taking account of the gain assigned to the routing object (the father of the new objects) compatible with the call message and having a maximum gain, and gains for each of the five new objects.

According to a first alternative of the invention, the gain of each of the new objects corresponding to a call message is held at zero until income and cost information come to increment this gain. The number of calls associated logically to each new object is initialized to 1 while awaiting new calls. A second alternative consists in updating in real-time the gains and number of calls associated logically to each new object by simulation. This simulation consists, for the five new objects, in assigning to each of them respective communications with which they are compatible, then computing new gains for each new object.

Only the objects with maximum segmentation gain are kept in the list. Objects with too little segmentation gain are deleted and all the communications associated to them are then associated to the father of the deleted objects. To make matters clearer, if an object with positive gain includes a downstream path parameter with nil depth, this means that the communication associated to the call message can be routed from the current switching node to any adjacent switching node, without any significant impact from an economic point of view for the network operator. Conversely, if the depth of a parameter is greater than 1, such as equal to four as shown in FIG. 6A for downstream path $CV_i$, this means that it is economically advantageous to predetermine in the current node, the routing ($CL_i$, $CTS_j$, $CTS_{j+1}$ and $CAA_k$) that will follow the communication associated to the call.

The result of this is that the number of new objects may be less then the number of parameters of a routing object, that is to say five. In fact, it is possible that one or several of the objects be at the far end of the tree-structure, either naturally (e.g. complete telephone number), or because the tree-structure of a given parameter, such as that of the downstream path parameter, is deliberately limited. The method embodying the invention can thus be carried out by limiting the tree-structures of the downstream and upstream path parameters to a trivial form, in which case the tree-structures no longer form genuine tree-structures and are limited solely to the respective incoming and outgoing trunk groups for each routing object. This choice of limiting the tree-structural description of given parameters can also result from organizational or technical considerations. To take an example a category of caller or callee code may only provide access to a sub-set of downstream paths. In all the above cases when the far end of the tree-structure is reached for a parameter of a given routing object, no new object can then be created for this parameter.

Thus, by testing for each call, the opportuneness of incrementing by 1 the depth of the tree-structural description of each parameter or of a limited number of parameters in a maximum gain object which is compatible with the call message thereby forming new objects, and only maintaining the new routing objects with maximum segmentation gain, i.e., the objects offering an economic advantage from the point of view of the network operator, for a given network state an optimum configuration of the routing objects in each switching node is obtained.

In fact, before this "convergence" toward a maximum economic configuration of routing objects, new routing objects are created to study the economic opportuneness of routing a communication according to a new object, and conversely routing objects are deleted if their segmentation gain is too low, meaning to say that there is no special economic advantage of determining in the node a specific tree-structure for a given parameter.

The routing object lists associated to the switching nodes can be initialized in any way given that the procedure for managing routing object lists makes the content of these lists converge toward optimum routing objects. Thus, for example it would be possible to use existing fixed routing matrices to create the initial routing objects. The procedure for managing object lists then expresses the convergence of the initial lists toward optimum lists from an economic point of view, given the notion of segmentation gain.

In short, through this object list managing procedure, in each of the lists associated to respective nodes, only are maintained the routing objects in which the tree-structural features of the parameters composing them offer an economic advantage from the point of view of the network operator.

The minimum initialization of the object lists in each switching node of the network consists in supplying a single routing object per switching node. This initialization simplicity can then lead to relatively long convergence times toward the optimum routing object lists. For this reason, as has been indicated previously, it is preferable to initialize the objects so as to reproduce the routing matrices corresponding to a routing method of known type.

The problem of initializing object lists is posed differently according to whether the whole of the network is to be initialized or simply an additional switching node to be connected to an existing network. The risks of instability or convergence toward sub-optimal object lists being more limited in the second case.

In order to speed up the convergence toward an optimum solution of object lists, stabilize the proposed routings and take account of the technical or administrative constraints, it is possible to restrict the route covered by object tree-structures, through inhibiting up and down transitions for certain object parameter values, for example by gelling their gain. By employing these restrictions, it is possible to modelize the different routing families that exist at present.

Procedure for processing calls in a given node

As soon as a call message transmitted through the signalling network SN is received, a switching node searches in the routing object list for all the objects whose parameters are compatible with signalling elements of the call message, that is to say the objects whose parameters are described by tree-structures with depths less than those of the tree-structures of the elements of the call message. Two alternatives can be provided to process a call.

According to a first alternative all the objects whose parameters are compatible with the call message are classified per family of objects having homogeneous tree-structure depths for their five parameters, meaning to say the same tree-structure depths. For each family the object having a maximum gain per communication is selected: this object has a certain segmentation gain. The families are then scanned one by one according to the decreasing order of segmentation gain of their object having a maximum gain per call. Inside a given family this operation consists in studying the opportuneness of routing the call according to each of the objects composing it by decreasing order of gain per communication. The object selected to route the communication along a give downstream path is the object with a maximum gain per communication. When changing family this corresponds to a loss of segmentation gain: a certain segmentation of the economic valuation of the call is not taken into account and therefore the economic valuation resulting therefrom loses its accuracy. This is taken into account by deducting from the gain per communication for a new family to be scanned, the difference in segmentation gain, reduced to one communication, relative to the previous family scanned.

According to a second alternative, so as to avoid this latter operation of deducting the segmentation gain on receiving a call message, it is possible to have gain values per communication directly comparable for all the compatible objects, whatever the family to which they belong, by taking account automatically of the segmentation gains between families and not when a call has to be processed.

The call message is routed via the signalling network along the downstream path determined by the downstream path parameter contained in the maximum gain-per-communication routing object. If one of the nodes in said downstream path refuses the communication call, a second downstream path determined by a routing object with gain per communication immediately below, is chosen to route this call, and so on.

By reiteration, in the event of the gain intensity of a routing object being negative, the call is definitively refused. Such a reject induces no cost for the communications using the trunk group (or groups) to which downstream path parameter of said object was directed given that this refusal was not caused by any saturation of the trunk group but by the evaluation of the economic advantage of the decision to route the communication on the trunk group.

Procedure for updating a gain intensity variable for n routing object

This procedure is especially important for carrying out the method embodying the invention. Before describing it, the principle of the charging of a telephone communication being set up between two calling and called user terminals is briefly reminded.

A communication call between two terminals is set up first of all by sending a first message from the local exchange of the calling terminal to the local exchange of the called terminal via the Signalling Network RS. Responsive to the line-set up (pick up) by the called terminal, an acknowledgement message is sent from the called terminal local exchange to the calling terminal local exchange, and activates in the latter the charging of the communication being set up, in a charge recorder attributed to the calling terminal. This charge recorder is incremented throughout the whole of the communication between the two terminals until the line is freed (hang-up) by one of the terminals. It should be observed that the transmission of the charging data in the Signalling Network is already widely developed within the context of the ISDN (Integrated Services Digital Network). The gains are thus updated after setting up the communication.

It has been seen previously that a gain equal to a difference between incomes and costs relative to various telephone communications logically associated to a routing object is associated to said routing object.

The communications are at the origin of the incrementation of the charge recorder and are associated logically to, or use for their routing in a network, respective routing objects.

The incomes relating to the gains of the routing objects depend on the charge accounts in the charge recorders and are transmitted by each node consisting of an user terminal's local exchange, in the Signalling Network RS, to increment gain variables relative to the routing objects used in the nodes for communications being set up and respectively crossing through these nodes.

Concerning the cost relative to the gain of a routing object, it results from the gain lost by a refusal (blocking) of calls which have been attempted through the downstream path defined by the downstream path parameter of the object. Two alternatives are provided.

According to a first alternative, the call overflows, that is to say the call is logically directed toward an available downstream path defined by a second compatible routing object. The cost then corresponds to the difference between firstly, the gain expected if the communication had been routed via the downstream path determined by the first routing object and whose node of the downstream path parameter had caused the refusal, and secondly, the gain expected from the communication via the downstream path determined by the downstream path parameter of the second routing object and having routed the call by overflow. The gain expected from the communication for each routing object is taken as equal to the ratio of the gain of the object to the number of communications in process logically associated to the object.

According to a second alternative, the call is definitively rejected on the switching node (i.e., blocked by all the downstream paths of the routing objects selected). The cost is then equal to the gain expected per call in the downstream path of the last selected routing object having given rise to the refusal.

When a cost, as has just been defined in relation to the two aforesaid alternatives, appears, it is passed on as follows. To each communication in progress on a resource (trunk group, switch) whose saturation is the cause of the cost, this cost is divided by the number of communications in progress and is allocated to the resource, said number of communications corresponding to the total capacity of the resource given that it is saturated. For each of these communications in process, the cost is transported by signalling and updates the gain values of the different objects which are logically associated to it in the different switching nodes of the network.

Thus an algebraic sum of incomes (charge accounts) and costs constituting the gain of an object is associated to each routing object. If N calls are directed toward the downstream path defined by the routing object, the gain per communication is taken as equal to the ratio between the gain for the routing object and the number N of communications in process assigned to the routing object.

Returning to the call processing procedure in a switching node, the call is systematically rejected when a gain for a routing object is null or negative, i.e., the income is less than or equal to the cost.

The different income and cost information involved in the gain values for the routing objects are obtained by transmitting charging information from the origin to the destination of the call in the Signalling Network RS.

When an income or cost information (charge account) is transmitted during a call and received at a moment t by a switching node to increment a gain value of a routing object, the gain value is then decremented at a moment t+T. From the "time window" T defined by a timer is obtained an average slip gain intensity. It is an integration duration during which the different gains computed for each routing object are averaged. This duration T can be defined for the network, for each node and even for each routing object. It can be determined in terms of time or else in function of events in the network (arrival or end of call). Thus, the time T can be constant or varied dynamically.

Compared to what exists in the Switched Telephone Network it would appear that, apart from specific developments within the context of the carrying out of each of the procedures described, the Signalling System (CCITT No. 7) as the Signalling Network, is capable of carrying the signalling specific to the invention, such as more sophisticated call message; and transmission of the charging and costs according to the described mechanisms.

From the above description, it results that the method for routing a communication replaces the following control functions employed in the switching nodes of currently known telephone networks or those in process of development:

the translation (initialization and determination of the paths as a function of the evolution of the network and its traffic);

the load sharing between the nodes and paths;

the adaptive routing of communications;

the monitoring of call flows on each switching node;

the expansive safetying of communications throughout the network;

the booking of circuits;

the spacing and filtering of calls.

Such a routing mechanism can also be used by those skilled in the art for purposes of simulation in order to study the behavior of a network in view of a traffic configuration in the network or a network initialization.

What I claim is:

1. A method for routing a communication signal at a switching node of a telecommunication network having a plurality of switching nodes during a set-up procedure of said communication signal, comprising the following steps:

(a) associating a list of routing objects with said switching node, each of said routing objects including five parameters defining a network path from a predetermined origin in said communication network, said parameters including an origin parameter associated with a predetermined origin of said communication signal in said network, a destination parameter associated with a predetermined destination of said communication signal in said network, an upstream path parameter associated with at least one network component upstream of said switching mode, a service parameter associated with at least one network condition necessary for routing said communication signal, and a downstream path parameter associated with a network component downstream from said switching node to said predetermined destination, each of said five parameters being described in a tree-structural form arranged to be constituted by a plurality of levels, each said routing object having a predetermined economic gain-per-communication associated therewith;

(b) transmitting a call set-up message during said set-up procedure, said call set-up message including a first signalling element designating a first call origin and a first call destination of said communication signal, and a second signalling element designating a first upstream path from said first call origin up to said switching node, each of said first and second signalling elements being described in a tree-structural form arranged to be constituted by a plurality of levels;

(c) searching for and identifying routing objects compatible with said call set-up message among said routing objects of said list of routing objects associated with said switching node, said origin, destination and upstream path parameters of each of said compatible routing objects each being described in a tree-structural form having fewer levels than each of the tree-structural forms describing said first and second signalling elements, respectively;

(d) selecting from among said compatible routing objects a routing object having a selected maximum economic gain-per-communication where an economic gain-per-communication for each routing object is defined as an average difference between incomes and costs accounted in real-time depending on charging information for each of all said communications compatible with a particular routing object;

(e) associating logically said communication signal with said selected routing object having a maximum gain-per-communication, so as to route said communication signal along a selected downstream path defined by a downstream path parameter included in said selected routing object, and (f) updating said economic gain of said selected routing object as a function of charging information associated with routing of said communication signal along said selected downstream path after receiving said call set-up message.

2. The method claimed in claim 1, where step (f) comprises the following sub-steps:

(i) creating new routing objects after receipt of "N" call set-up messages into said switching node where "N" is a predetermined integer at least equal to one, the number said new routing objects being created to equal no more than five, each of said new routing objects being virtually identical to the selected routing object with the exception of a single different parameter in each of said new routing objects where the tree-structural form level of each single different parameter is incremented by one;

(ii) computing an economic gain-per-communication for each of said new routing objects based upon communications being set up using call set-up messages for which first and second signalling elements are compatible with the origin, destination and upstream path parameters of said new routing objects; and (iii) deleting from said list of routing objects any routing object for which a product of an absolute value of a difference between an economic gain-per-communication of a new routing object and an economic gain-per-communication of said selected routing object and a number of communications being set-up and associated with said new routing object is less than a predetermined threshold.

3. The method claimed in claim 1, wherein in step (d) said costs are calculated using real-time charging information as follows:

when a redirection from a first downstream path to a second downstream path occurs, where said first downstream path is defined by said downstream path parameter of said selected routing object and said second downstream path is defined by a second downstream path parameter of a second routing object compatible with said call set-up message, a cost resulting from said redirection is equal to a difference between a first expected economic gain and a second economic gain where said first economic gain is equal to said maximum economic gain-per-communication of said selected routing object if said communication had been routed along said first downstream path and said second expected economic gain is equal to a second gain-per-communication if said communication is routed along said second downstream path.

* * * * *